United States Patent
Negre et al.

(10) Patent No.: US 9,045,982 B2
(45) Date of Patent: Jun. 2, 2015

(54) SELF-PRESSURE-REGULATING COMPRESSED AIR ENGINE COMPRISING AN INTEGRATED ACTIVE CHAMBER

(75) Inventors: Guy Negre, Luxembourg (LU); Cyril Negre, Nice (FR)

(73) Assignee: MOTOR DEVELOPMENT INTERNATIONAL S.A., Luxembourg (LU)

(*) Notice: Subject to any disclaimer, the term of this patent is extended or adjusted under 35 U.S.C. 154(b) by 264 days.

(21) Appl. No.: 13/823,498

(22) PCT Filed: Oct. 3, 2011

(86) PCT No.: PCT/EP2011/067212
§ 371 (c)(1),
(2), (4) Date: Mar. 14, 2013

(87) PCT Pub. No.: WO2012/045694
PCT Pub. Date: Apr. 12, 2012

(65) Prior Publication Data
US 2013/0167520 A1    Jul. 4, 2013

(30) Foreign Application Priority Data
Oct. 5, 2010   (FR) ..................... 10 58037

(51) Int. Cl.
*F02C 5/00* (2006.01)
*F01K 13/00* (2006.01)
*B60K 16/00* (2006.01)
*F01B 29/10* (2006.01)
*F01B 17/02* (2006.01)
*F02B 21/00* (2006.01)
(Continued)

(52) U.S. Cl.
CPC ................. *F01B 29/10* (2013.01); *F01B 17/02* (2013.01); *F01B 17/022* (2013.01); *F02B 21/00* (2013.01);
(Continued)

(58) Field of Classification Search
CPC ........ F01B 29/10; F01B 17/02; F01B 17/022; F24J 2/42; F02M 31/163; F02M 31/042; F02B 21/00; Y02E 10/46; Y02T 10/126
USPC ............... 60/641.8, 508–515, 650, 39.6, 676, 60/698, 682, 684
See application file for complete search history.

(56) References Cited

U.S. PATENT DOCUMENTS 3,756,022 A * 9/1973 Pronovost et al. .............. 60/645
4,077,221 A * 3/1978 Maeda ........................... 60/650
(Continued)

FOREIGN PATENT DOCUMENTS

FR       1058005 A      3/1954
GB    2 402 169 A     12/2004
(Continued)

OTHER PUBLICATIONS

International Search Report, dated Nov. 7, 2011, from corresponding PCT application.

*Primary Examiner* — Hoang Nguyen
(74) *Attorney, Agent, or Firm* — Young & Thompson

(57) ABSTRACT

An engine with an active chamber, having at least one piston (2) mounted in a cylinder (1) in a sliding manner and driving a crankshaft (5) via a slider-crank device (3, 4) and operating according to a four-phase thermodynamic cycle includes: an isothermal expansion without work; a transfer—slight so-called quasi-isothermal expansion with work; a polytropic expansion with work; and an exhaust at ambient pressure, preferentially supplied by compressed air contained in a high-pressure storage tank (12), through a buffer capacity, called a working capacity (11), which is expanded at an average pressure, called a working pressure, in a working capacity, preferentially through a dynamic pressure-reducing device (13), wherein the active chamber is included in the engine cylinder, the cylinder volume being swept by the piston and divided into two separate parts, a first part forming the active chamber (CA) and a second part forming the expansion chamber (CD).

16 Claims, 7 Drawing Sheets

(51) Int. Cl.
*F02M 31/04* (2006.01)
*F02M 31/16* (2006.01)
*F24J 2/42* (2006.01)

(52) U.S. Cl.
CPC ........... *F02M 31/042* (2013.01); *F02M 31/163* (2013.01); *F24J 2/42* (2013.01); *Y02T 10/126* (2013.01); *Y02E 10/46* (2013.01)

(56) References Cited

U.S. PATENT DOCUMENTS 6,318,068 B1 * 11/2001 Shaw ............................ 60/39.6
7,111,452 B2 * 9/2006 Miyoshi et al. ................. 60/285
2004/0261415 A1 12/2004 Negre et al.
2005/0224059 A1 10/2005 Negre et al.
2007/0101712 A1 5/2007 Negre et al.
2010/0005801 A1 * 1/2010 Negre et al. ..................... 60/651
2010/0218750 A1 * 9/2010 Negre et al. .................... 123/540

FOREIGN PATENT DOCUMENTS

| | | |
|---|---|---|
| GB | 2 457 917 A | 9/2009 |
| WO | 03/036088 A1 | 5/2003 |
| WO | 03/089764 A1 | 10/2003 |
| WO | 2005/049968 A1 | 6/2005 |
| WO | 2008/028881 A1 | 3/2008 |
| WO | 2009/036992 A1 | 3/2009 |
| WO | 2010/012921 A1 | 2/2010 |

* cited by examiner

SELF-PRESSURE-REGULATING COMPRESSED AIR ENGINE COMPRISING AN INTEGRATED ACTIVE CHAMBER

The invention relates to an engine operating in particular with compressed air, or any other gas, and using a chamber called an "active chamber".

The inventors have filed numerous patents concerning motor drives and their installations, using gases and more particularly compressed air for totally clean operation in urban and suburban sites.

They have notably filed an international patent application WO-A1-03/036088, to the content of which reference can be made, relating to an additional compressed air injection motor-compressor—motor-alternator set operating on single and multiple energies.

In these types of engine operating with compressed air and comprising a compressed air storage tank, it is necessary to expand the compressed air stored at very high pressure in the tank but whose pressure decreases as the tank empties, to a stable intermediate pressure called final pressure of use, in a buffer vessel—called working vessel—before it is used in the engine cylinder or cylinders.

The well-known conventional pressure regulators with valves and springs have very low throughputs and their use for this application requires very heavy and not very efficient apparatus. Furthermore, they are very sensitive to freezing up due to the humidity of the cooled air during the expansion.

To resolve this problem, the inventors have also filed a patent application WO-A1-03/089764, to the content of which reference can be made, relating to a variable throughput pressure regulator and a distribution for engines fed with compressed air injection, comprising a high-pressure compressed air tank and a working vessel.

In the operation of these "load relieving" engines, the filling of the expansion chamber always represents an expansion without work that is detrimental to the general efficiency of the machine.

To resolve the above problem, the inventors have even filed the patent application WO-A1-2005/049968 describing a compressed air engine preferentially fed with compressed air or any other compressed gas contained in a storage tank at high pressure, previously expanded to a nominal working pressure in a buffer vessel called working vessel. The working vessel in dual-energy version comprises a device for reheating the air fed by an additional energy (fossil or other energy) making it possible to increase the temperature and/or the pressure of the air which passes through it.

In this type of engine according to WO-A1-2005/049968:
the expansion chamber is made up of a variable volume equipped with means making it possible to produce work, and it is twinned and in contact via a permanent passage with a space contained above the main drive piston which is equipped with a device for stopping the piston at its top dead center point,
during the stopping of the drive piston at its top dead center point, the air or the gas under pressure is admitted into the expansion chamber when the latter is at its smallest volume and, under the thrust, will increase its volume while producing work,
with the expansion chamber being maintained substantially at its maximum volume, the compressed air which is contained therein then expands into the engine cylinder, thus pushing back the drive piston in its down stroke while supplying work in its turn,
during the upstroke of the drive piston during the exhaust phase, the variable volume of the expansion chamber is returned to its smallest volume to recommence a complete work cycle.

The expansion chamber of the engine according to this invention actively participates in the work. The engine is thus called "active chamber" engine.

The document WO-A1-2005/049968 claims in particular a thermodynamic cycle in four phases during its operation in compressed air single-energy mode, characterized by:
an isothermal expansion without work;
a transfer—slight expansion with so-called quasi-isothermal work;
a polytropic expansion with work;
an exhaust at ambient pressure.

The document WO-A1-2008/028881, which presents a variant of WO-A1-2005/049968, claims the same thermodynamic cycle but using a conventional connecting rod-crank device. It is preferentially fed by compressed air or any other compressed gas contained in a storage tank at high pressure, previously expanded to a nominal working pressure in a buffer vessel called working vessel. The working vessel in the dual-energy version comprises a device for reheating the fed air by an additional energy (fossil or other energy) making it possible to increase the temperature and/or the pressure of the air which passes through it.

In this type of engine according to WO-A1-2008/028881:
the expansion chamber, called active chamber, is made up of a variable volume equipped with means making it possible to produce work and it is linked by a passage comprising a blocking device thus making it possible to isolate it or to place it in contact with the volume contained in the engine cylinder above the drive piston at its top dead center point;
the air or the gas under pressure is admitted into the active chamber when the latter is at its smallest volume and, under the thrust, will increase its volume while producing work;
when the active chamber is substantially at its maximum volume, and the drive piston is substantially at its top dead center point, the intake is blocked, said chamber is connected with the engine cylinder and the compressed air contained therein expands thus pushing back the drive piston in its down stroke and supplying work in its turn;
during the expansion, the volume of the active chamber is returned to its minimum volume to allow for a new cycle.

The expansion chamber of the engine according to the invention actively participates in the work. The engines according to WO-A1-2005/049968 and WO-A1-2008/028881 are called active chamber engines.

More recently, the inventors have filed a new patent application for a compressed air engine with so-called "included" active chamber which implements the same thermodynamic cycle as the engines according to WO-A1-2005/049968 and according to WO-A1-2008/028881, as well as a conventional connecting rod-crank device. According to this new French Patent application number FR1058005 filed on Oct. 4, 2010, the inventors have proposed an engine with active chamber included in the engine cylinder, comprising at least one piston mounted to slide in a cylinder and driving a crankshaft by means of a conventional connecting rod-crank device and operating according to a thermodynamic cycle with four phases comprising:
an isothermal expansion without work;
a transfer—slight expansion with so-called quasi-isothermal work;

a polytropic expansion with work;
an exhaust at ambient pressure;
preferentially fed by compressed air, or any other compressed gas, contained in a storage tank at high pressure, through a buffer vessel called working vessel which is fed by compressed air, or any other compressed gas, contained in a storage tank at high pressure, which is expanded at an average pressure called working pressure in a working vessel preferentially through a dynamic pressure-regulating device, characterized:

- in that it comprises at least one piston mounted to slide in at least one cylinder, in which the volume swept by the piston is divided into two distinct parts, a first part constituting the active chamber CA which is included in the cylinder and a second part constituting the expansion chamber CD;
- in that the volume of the cylinder which is swept by the piston is closed in its top part by a cylinder head comprising at least one intake duct and orifice and at least one exhaust duct and orifice and which is formed in such a way that, when the piston is at its top dead center point, the residual volume contained between the piston and the cylinder head is, by construction, reduced to just the minimum gaps allowing for the contactless operation between the piston and the cylinder head;
- in that the compressed air or gas under pressure is admitted into the cylinder above the piston and, under the continuous thrust of the compressed air at constant working pressure, the volume of the active chamber increases while producing work representing the quasi-isothermal transfer phase;
- in that the intake of the compressed air, or of the gas under pressure, into the cylinder is blocked when the maximum volume of the active chamber CA is reached, and the quantity of compressed air, or of the gas under pressure, contained in said active chamber then expands, pushing back the piston over the second part of its stroke which determines the expansion chamber CD while producing work thus ensuring the expansion phase;
- in that, the piston having reached its bottom dead center point, the exhaust orifice is then opened to ensure the exhaust phase during the upstroke of the piston over all of its stroke.

The maximum volume of the active chamber CA and the volume of the expansion chamber CD are dimensioned in such a way that, at the nominal operating pressure of the engine, the pressure at the end of expansion at the bottom dead center point is close to atmospheric pressure. The maximum volume of the active chamber is determined by the closure of the intake.

Advantageously, and notably in single-energy operation with compressed air, the engine with active chamber included in the cylinder described above comprises a number of successive cylinders of increasing cylinder size. The first cylinder, of smallest cylinder size, is fed with compressed air by the working vessel. The subsequent cylinder or cylinders, of increasing cylinder sizes are fed with compressed air by the exhaust from the preceding upstream cylinder. An air/air heat exchanger with the atmosphere is positioned between the two cylinders of a pair of successive cylinders thus making it possible to increase the temperature of the exhaust air from the preceding cylinder, to bring it close to the ambient/atmospheric temperature and thus increase the volume of the air exhausted.

Preferentially, the engine is fed in a manner after the teachings of the documents WO-A1-2005/049968 and WO-A1-2008/028881, by compressed air, or by any other compressed gas, contained in a storage tank at high pressure, previously expanded, to a nominal working pressure, in a buffer vessel—called working vessel.

The working vessel in dual-energy version comprises a device for reheating, or thermal reheater, the air or gas which is powered by an additional energy (fossil or other energy) making it possible to increase the temperature and/or the pressure of the air which passes through it. This engine is said to be with "included" active chamber.

However, even if it is possible, in the case of an engine with a plurality of stages, to feed the first of the cylinders at high pressures, it is still necessary to expand the air compressed at very high pressure contained in the storage tank at high pressure to a nominal working pressure, and this expansion operation, either provokes a loss of efficiency through the use of a conventional pressure regulator or, with the use of the teachings of the document WO-A1-03/089764, incurs no energy cost, but this expansion does not make it possible to perform any expansion work between the high pressure contained in the tank and the nominal working pressure in the constant volume working vessel.

The engine with active chamber included in the cylinder according to the present invention sets out to resolve this last problem and it uses the functional arrangements of the engine cylinder with active chamber included in the cylinder, it performs the complete expansion of the storage tank, it operates in single- and/or dual-energy modes with additional energy. This novel engine, called "self-pressure-regulated" engine constitutes a "multi-mode" engine with active chamber included in the cylinder, and serving as pressure regulator.

The invention thus proposes an engine, comprising at least one cylinder and one piston which is mounted to slide in the cylinder and which drives a crankshaft by means of a conventional connecting rod-crank device, in which the volume of the cylinder swept by the piston is divided into two distinct parts, a first part constituting the active chamber CA which is included in the cylinder and a second part constituting the expansion chamber CD, the cylinder being closed in its top part by a cylinder head including at least one duct and one intake orifice and at least one duct and one exhaust orifice, and which is arranged in such a way that, when the piston is at its top dead center point, the residual volume contained between the piston and the cylinder head is, by construction, reduced to the very minimum gaps enabling the contactless operation between the piston and the cylinder head, and in which compressed air, or any other gas under pressure, supplied from a storage tank of compressed air, or of any other gas under pressure, is admitted into the cylinder above the piston, and, under the continuous thrust of the compressed air, or any other gas under pressure, the volume of the active chamber increases while producing work, the intake of the compressed air, or any other gas under pressure, into the cylinder is blocked when the maximum volume of the active chamber is reached, and the quantity of compressed air, or any other gas under pressure, contained in said active chamber then expands while pushing back the piston over the second part of its stroke while producing work thus ensuring the expansion phase, the piston having reached its bottom dead center point, the exhaust orifice is then opened to ensure the exhaust phase while the piston rises up over all of its stroke, characterized:

- in that the storage tank of compressed air at high pressure, or of any other gas under pressure, directly feeds the intake of the engine cylinder;
- in that the active chamber CA in the cylinder is filled at a constant intake pressure on each engine revolution, this intake pressure decreasing as the pressure in the storage tank decreases during the progressive emptying of this tank, in that the maximum volume of the active chamber CA is variable and increases progressively as the pressure in the storage tank which determines said intake pressure decreases;

in that the means for opening and closing the intake of the compressed air into the active chamber make it possible not only to open the intake orifice and duct substantially at the top dead center point of the stroke of the piston, but also make it possible to modify the duration and/or the angular sector of the intake, as well as the passage section of the opening;

and in that the maximum volume of the active chamber CA is dimensioned for the maximum storage pressure, then is progressively increased so that, depending on the intake pressure, on the ratio of volumes between the active chamber CA and the expansion chamber CD, the pressure at the end of expansion before the opening of the exhaust is close to atmosphere pressure.

By virtue of the above, the engine according to the invention also serves as pressure regulator, the invention thus making it possible to propose a "self-pressure-regulating" engine which requires no independent pressure regulator, regardless of its type, to feed the active chamber.

The multi-mode self-pressure-regulating engine with active chamber according to the invention notably implements, in its operation in compressed air single-energy mode, a thermodynamic cycle with three phases comprising:

an isobaric and isothermal transfer
a polytropic expansion with work
an exhaust at ambient pressure.

In the operation of the engine according to the invention, the maximum volume of the active chamber included in the cylinder determines the quantity of compressed air injected. The higher the intake pressure, the smaller the volume of the active chamber has to be.

Also, the higher the intake pressure, the greater the potential power of the engine for one and the same cylinder size. For a given cylinder size, the increase in the maximum volume of the active chamber included in the cylinder, according to the decrease in intake pressure, makes it possible to keep the power of the engine almost constant, within a certain usage pressure range, for example from 210 to 140 bar. Below the lower value, the power of the engine then drops progressively, so ideally, the total cylinder size of the engine has to be able to increase as the intake pressure decreases.

According to a variant of the invention, the engine according to the invention comprises at least two cylinders of increasing cylinder size each operating according to the same principle which has just been described, and characterized:

in that, when the intake pressure is in its top range, corresponding for example to the top third of the values of the intake pressure, only the cylinder of smallest cylinder size is fed;

in that, when the intake pressure is in an intermediate range, corresponding for example to the median third of the values of the intake pressure, only the second cylinder of larger cylinder size is fed;

and in that, when the intake pressure is in its bottom range, corresponding for example to the bottom third of the values of the intake pressure, the two cylinders are fed at the same time.

On the same principle, it is possible to produce an engine according to the invention comprising at least three cylinders, including said at least two cylinders of increasing cylinder size, by virtue of which it is possible to adjust more finely the total cylinder size used as a function of the intake pressure, by having said at least three cylinders of the engine operate in succession, jointly and/or in combination.

In its dual-energy application and in additional fuel mode, in an engine according to the invention, between the storage tank and the intake of the engine, there is a thermal device forming an isobaric reheater making it possible to increase, at constant pressure, the temperature of the air, or of any other gas, which passes through it and to increase the quantity of energy which can be used and is available through the fact that the compressed air, or any other gas, at constant pressure and before its introduction into the active chamber CA, will increase its temperature and increase its volume while making it possible to increase the range of a machine equipped with the engine, in proportion to said volume increase.

In compressed air mode, for example when the engine according to the invention is installed on a vehicle in an urban site, only the pressure of the air, or of any other gas, compressed in the high-pressure tank is used for operation.

In operation in mode with additional energy, fossil or other, for example when the engine according to the invention is installed on a road vehicle, the reheating of the compressed air is then controlled, thus making it possible to increase the temperature of the air and consequently the volume that can be used for the load work of the active chamber and of the expansion.

The heating is isobaric and by increasing the temperature two-fold, it becomes possible to double the useful volume of compressed air, and so on.

Thus, a tank of 200 liters of compressed air at 200 bar, or 40 $m^3$ of air at 293 K (20° Celsius) makes it possible to have, at 586 K (or 313° Celsius), 80 $m^3$ of compressed air. The reheating of the compressed air, initially at ambient temperature, makes it possible, with little energy, to quickly obtain significant temperatures while controlling their value in order, preferentially, to remain below temperatures at which particularly polluting and poisonous nitrogen oxides are formed.

The use of a thermal device forming a reheater offers the advantage of being able to use clean continuous combustions which can be catalyzed or depolluted by any known means, in order to obtain infinitesimal pollutant emissions.

The thermal device forming a reheater can, for energy, use a fossil fuel such as petrol, diesel or even LPG or VNG gas. It can also use bio-fuels or alcohol/ethanol, thus making it possible to produce a dual-energy operation with external combustion in which a burner will provoke a temperature rise. It can also use thermo-chemical methods allowing for such a temperature rise.

According to a variant of the invention, the engine uses solar energy to reheat the compressed air, or any other gas, and—to this end—the thermal device forming an isobaric reheater comprises a solar dish focusing into the thermal device forming an isobaric reheater to make it possible to increase the temperature of the compressed air, or of any other gas, and to increase the quantity of energy that can be used and is available through the fact that the compressed air, or any other gas, at constant pressure, and before its introduction into the active camber CA, will increase its temperature and increase volume while making it possible to increase the range of said machine.

The different energies used and the reheating thermal devices used separately or in combination can vary, without in any way altering the principle of the invention.

In operating mode with additional energy, the thermodynamic cycle of the engine according to the invention has four phases comprising:

an isobaric increase in temperature;
an isobaric/isothermal transfer;
a polytropic expansion with work;
an exhaust at ambient pressure.

According to a variant of the invention, which allows for stand-alone operation of the engine according to the invention in dual-energy mode, the engine serving as pressure regulator, is coupled with and drives an air compressor making it possible, during its operation with an additional energy, to feed compressed air, or any other gas, to the storage tank at high pressure.

Preferentially, a heat exchanger, air-air or other, which is positioned between the compressor and the storage tank so that the compressed air, or any other gas, at high pressure and at high temperature at the output of the compressor returns, in the storage tank, to a temperature close to ambient temperature.

In this configuration, the engine according to the invention operates according to a thermodynamic cycle with six phases comprising:
a polytropic compression of the ambient/atmospheric air;
a cooling to ambient/atmospheric temperature for storage;
an isobaric increase in temperature;
an isobaric and isothermal transfer;
a polytropic expansion with work;
an exhaust at ambient pressure.

The control of the engine in terms of torque and speed is managed by a preferentially electronic device, the torque and the speed of the engine are controlled by a device driven by an accelerator which controls the opening and closing of the means for opening/closing the intake duct which feeds compressed air, or any other gas, to the active chamber CA while making it possible not only to open the opening/closing means, substantially at the top dead center point, but also to modify the duration and/or the angular sector of the intake, as well as the passage section of the opening in order to determine the pressure at the end of expansion, as a function of the pressure in the storage tank, the quantity of compressed air, or of any other gas, admitted, the volume of the active chamber CA by the closing of the opening/closing means.

The single-energy and dual-energy engine according to the invention equipped in this way operates according to three modes, which can be used separately or in combination, comprising:
the single-energy, zero pollution, operating mode, with the air, or any other gas, previously compressed contained in the storage tank at high pressure;
the dual-energy operating mode, with the air, or any other gas, previously compressed contained in the storage tank plus the additional energy added by a thermal device forming a reheater;
the stand-alone dual-energy operating mode, with the air, or any other gas, compressed in the storage tank by a compressor driven by the engine, plus the additional energy added by the thermal device forming a reheater.

The heat exchangers can be air/air or air/liquid exchangers or any other gas or device producing the desired effect.

The engine with active chamber according to the invention can be used on all land, sea, rail and air craft. The engine with active chamber according to the invention can also advantageously be applied to emergency generator sets, as well as numerous domestic cogeneration applications producing electricity, heating and air conditioning.

Other aims, advantages and features of the invention will become apparent on reading the nonlimiting description of a number of embodiments, given in light of the appended drawings in which:

FIG. 1 schematically represents an engine according to the invention with active chamber included in the cylinder which is illustrated in axial cross section, represented at its bottom dead center point and with its compressed air feed device;

Figure 7:
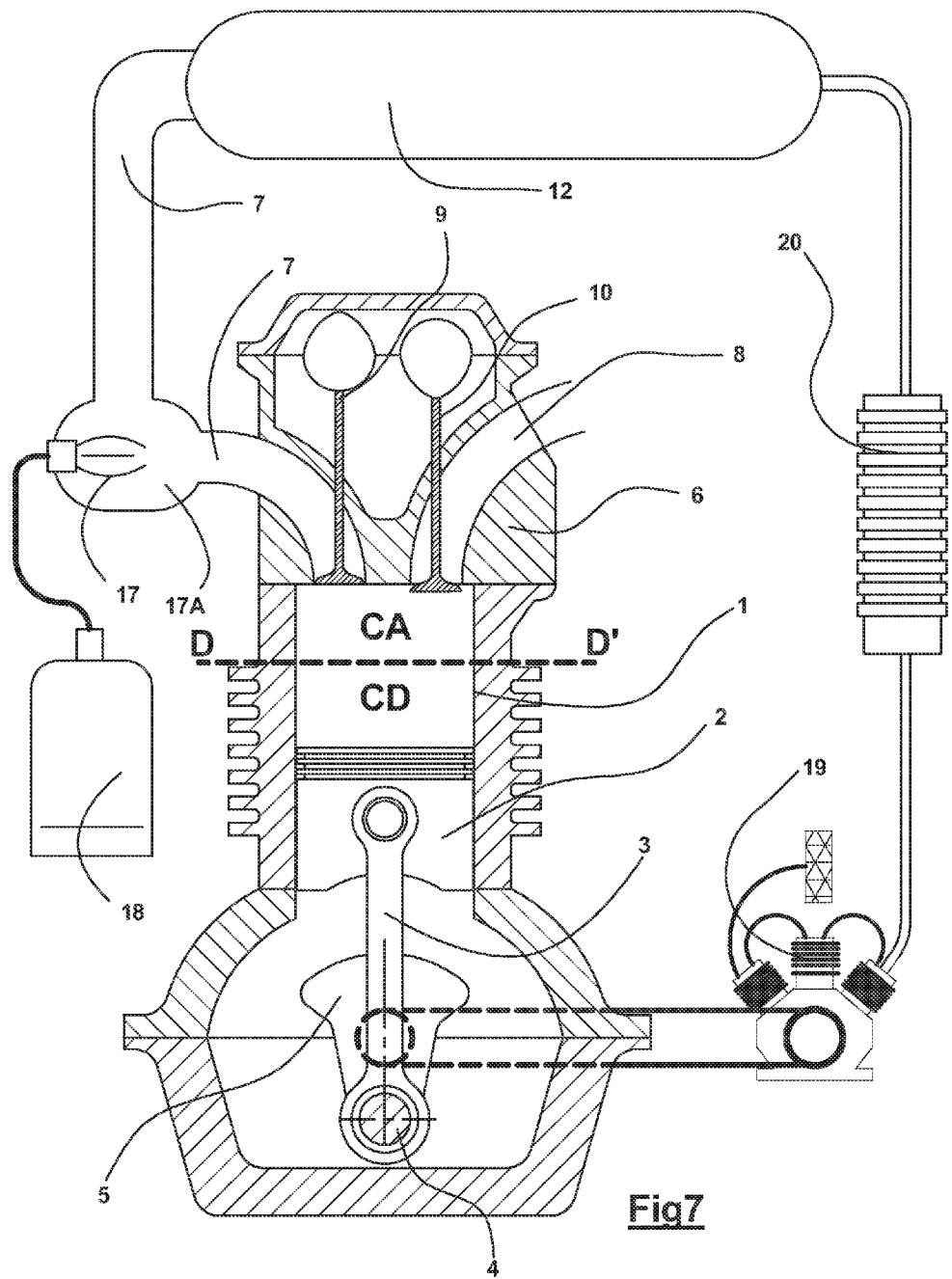

FIG. 7 schematically represents an engine according to the invention coupled to a compressor feeding the storage tank.

Figure 1:
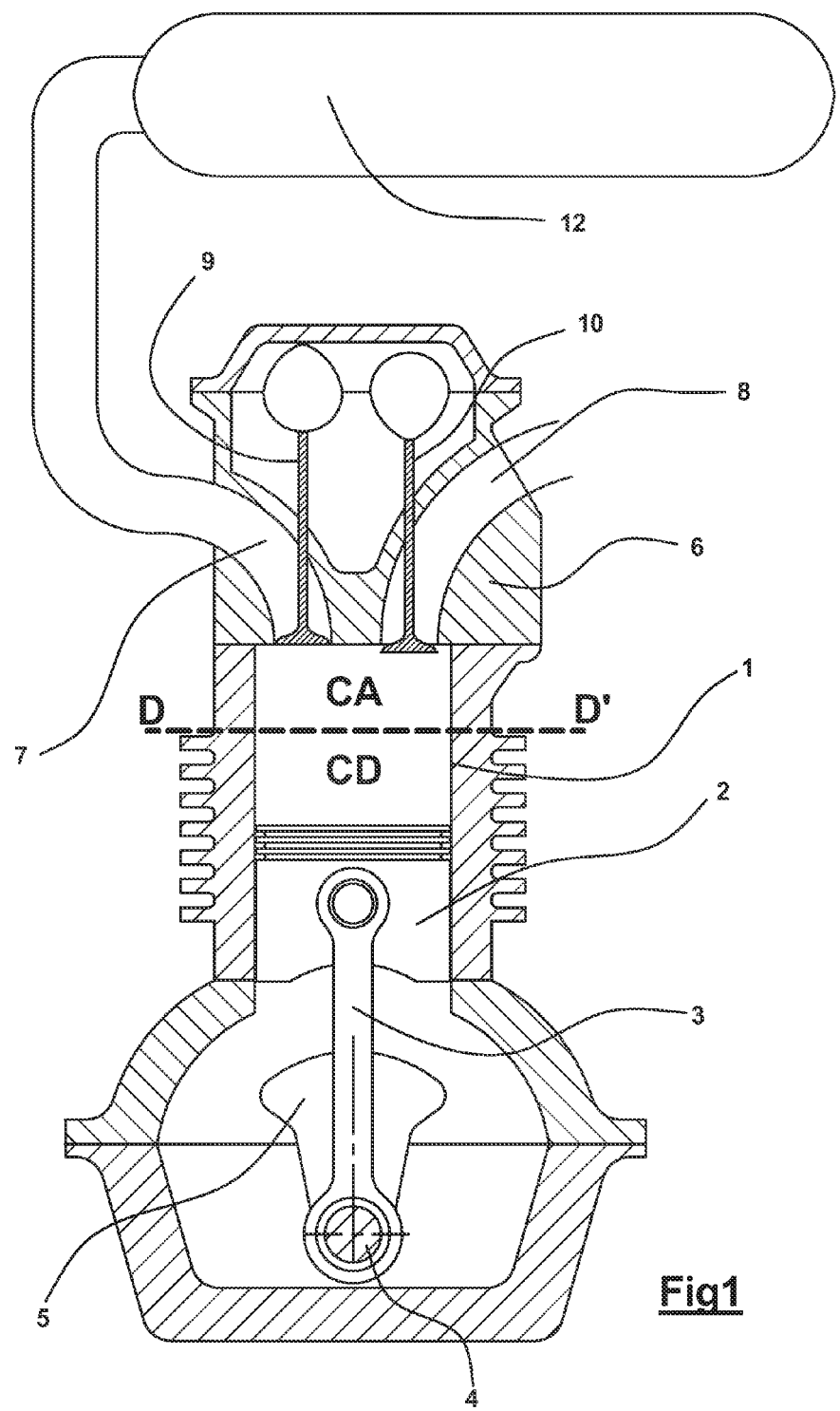

FIG. 1 represents a self-pressure-regulating engine with active chamber according to the invention on which can be seen an engine cylinder 1 in which a piston 2 slides, linked by a connecting rod 3 to the crank pin 4 of a crankshaft 5.

The volume of the engine cylinder 1 according to the invention which is swept by the piston 2 is divided according to an imaginary line DD' (corresponding to a division plane orthogonal to the axis of the cylinder) into two parts: a first part constituting the active chamber CA, which is thus included in the cylinder, and a second part constituting the expansion chamber CD.

When the piston 2 is at its top dead center point, by construction, the residual volume between the top face of the piston and the portion facing the cylinder head 6 is null, or quasi-null, and the volume of the active CA and expansion CD chambers is then null.

From the top dead centre point of the piston, the volume of the cylinder swept by the piston and situated above the top face of the piston will increase progressively, thus creating, in succession, the active chamber CA, then the expansion chamber CD.

The down stroke of the piston 2 in the cylinder 1 thus comprises, consecutively, a first "top" part corresponding to the progressive formation of the so-called active chamber CA, and a second "bottom" part corresponding to the progressive formation of the so-called expansion chamber CD.

The engine cylinder 1 is capped by a top cylinder head 6 comprising an intake duct 7 and an exhaust duct 8 opening into the cylinder 1, as well as associated means for blocking said ducts, these means here being intake 9 and exhaust 10 valves respectively.

In accordance with the invention, the intake duct 7 is directly linked to the high-pressure tank 12 which thus directly feeds the active chamber CA via the intake duct 7.

The compressed air at high pressure contained in the high-pressure storage tank 12 directly feeds the active chamber CA via the intake duct 7 at constant pressure during each engine revolution, this pressure decreasing as the pressure drops in the storage tank, while it is emptying, that is to say progressively as it empties.

To allow for the engine speed and load to be controlled, a device (not represented) controlled by an electronic computer which takes into account in particular the position of an accelerator such as an accelerator pedal, the pressure of the compressed air contained in the storage tank, the speed of rotation of the engine, as well as other operating parameters, and which controls the opening and the closing of the intake valve 9 of the intake duct 7 which feeds compressed air to the included active chamber CA, making it possible not only to open the valve substantially at the top dead center point, but also to modify the duration and/or the angular sector of the intake, as well as the passage section of the opening by modifying the lifting of the valve in order to determine, as a function of all or some of these various parameters:

the quantity of compressed air admitted;
the volume of the active chamber CA through the closing of the valve 9;
the pressure at the end of expansion.

Figure 2:
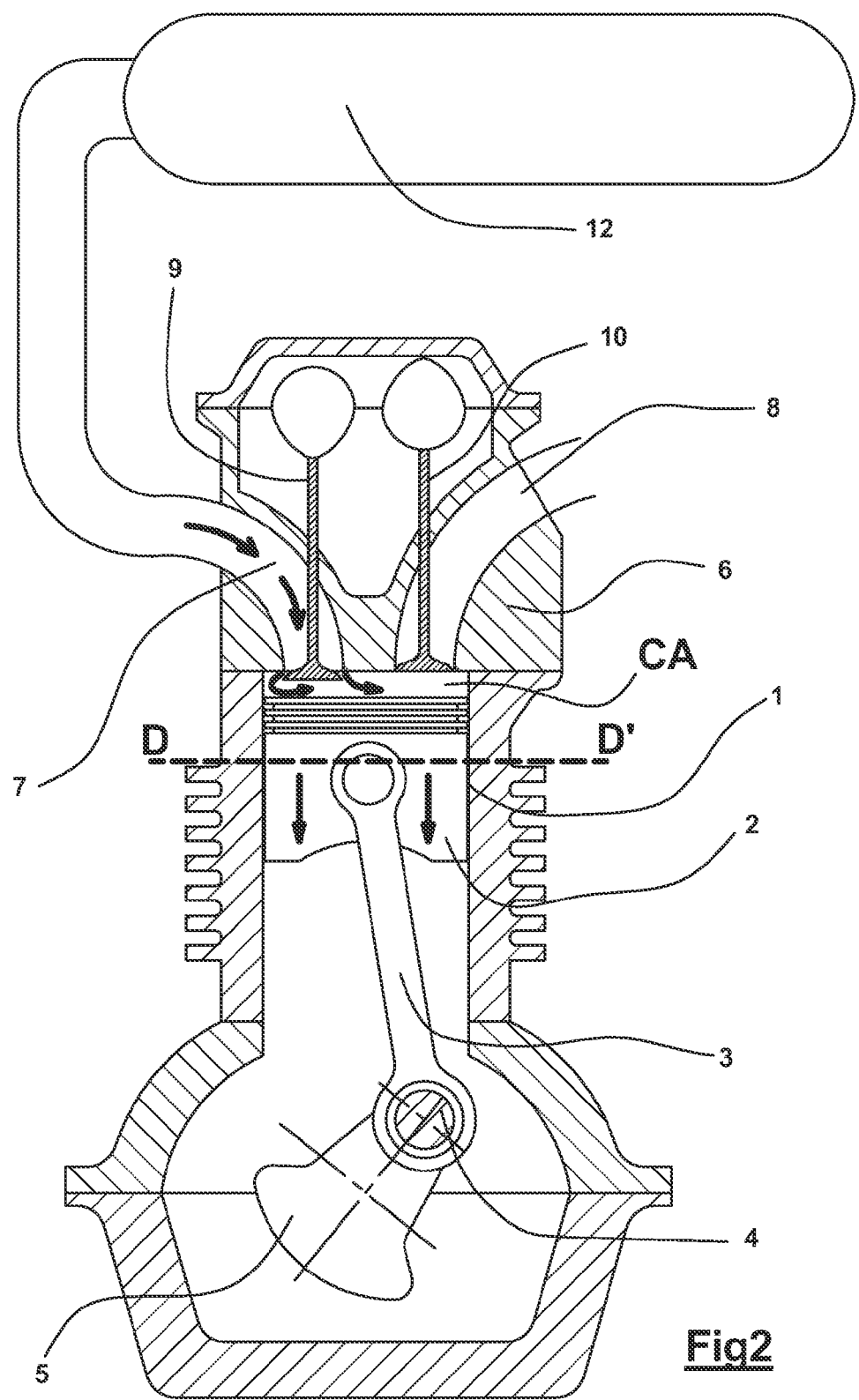
FIGS. 2 to 4 represent the different phases of operation of the engine according to the invention.

FIG. 2 represents the engine according to the invention during the intake phase, the intake valve 9 having been opened on reaching the top dead center point. The pressurized compressed air contained in the storage tank 12 feeds the included active chamber CA whose volume increases progressively and it pushes back the piston 2 in its down stroke, producing work and performing the first phase of the thermodynamic cycle: isobaric and isothermal transfer.

Figure 3:
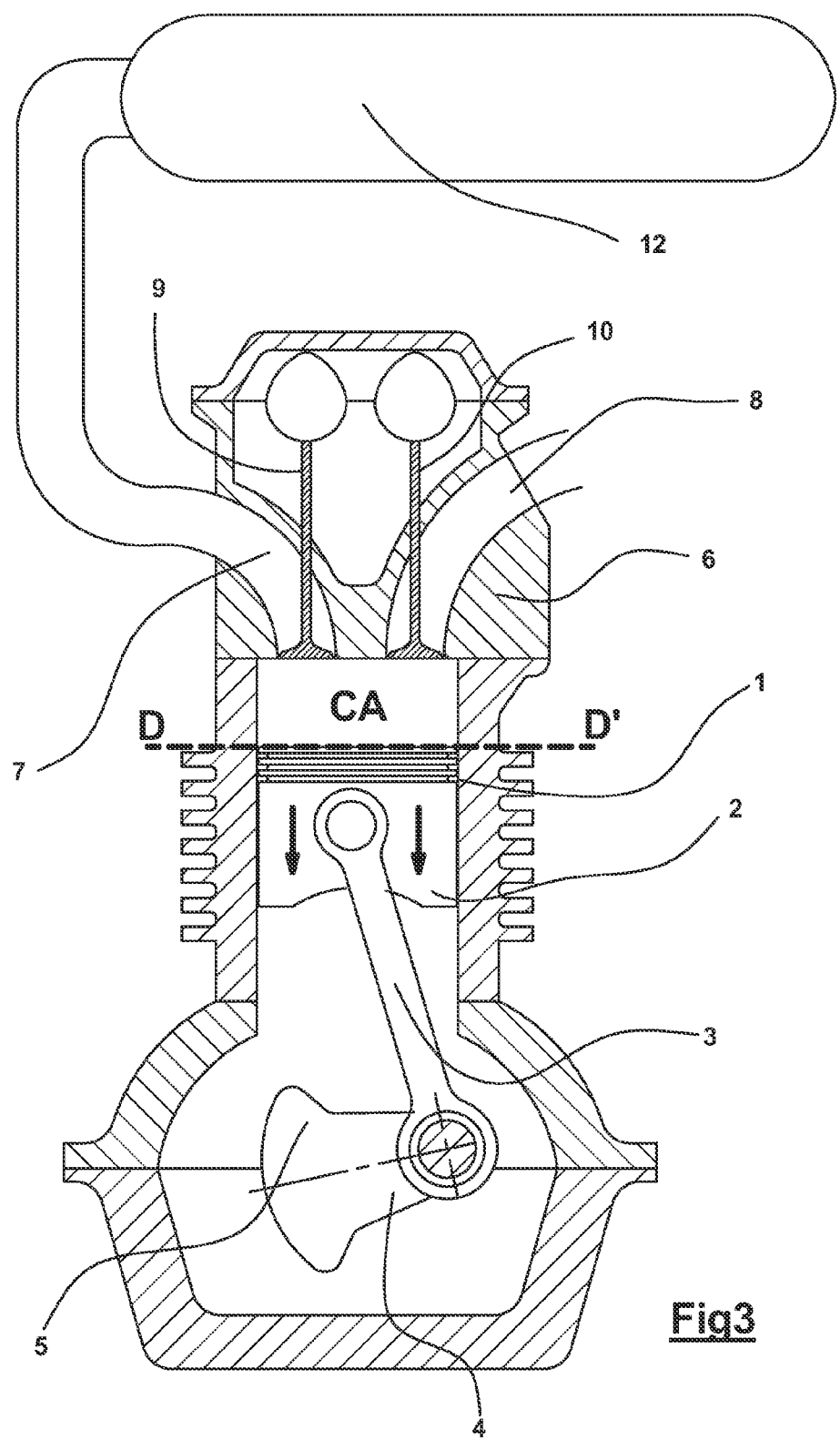
Figure 4:
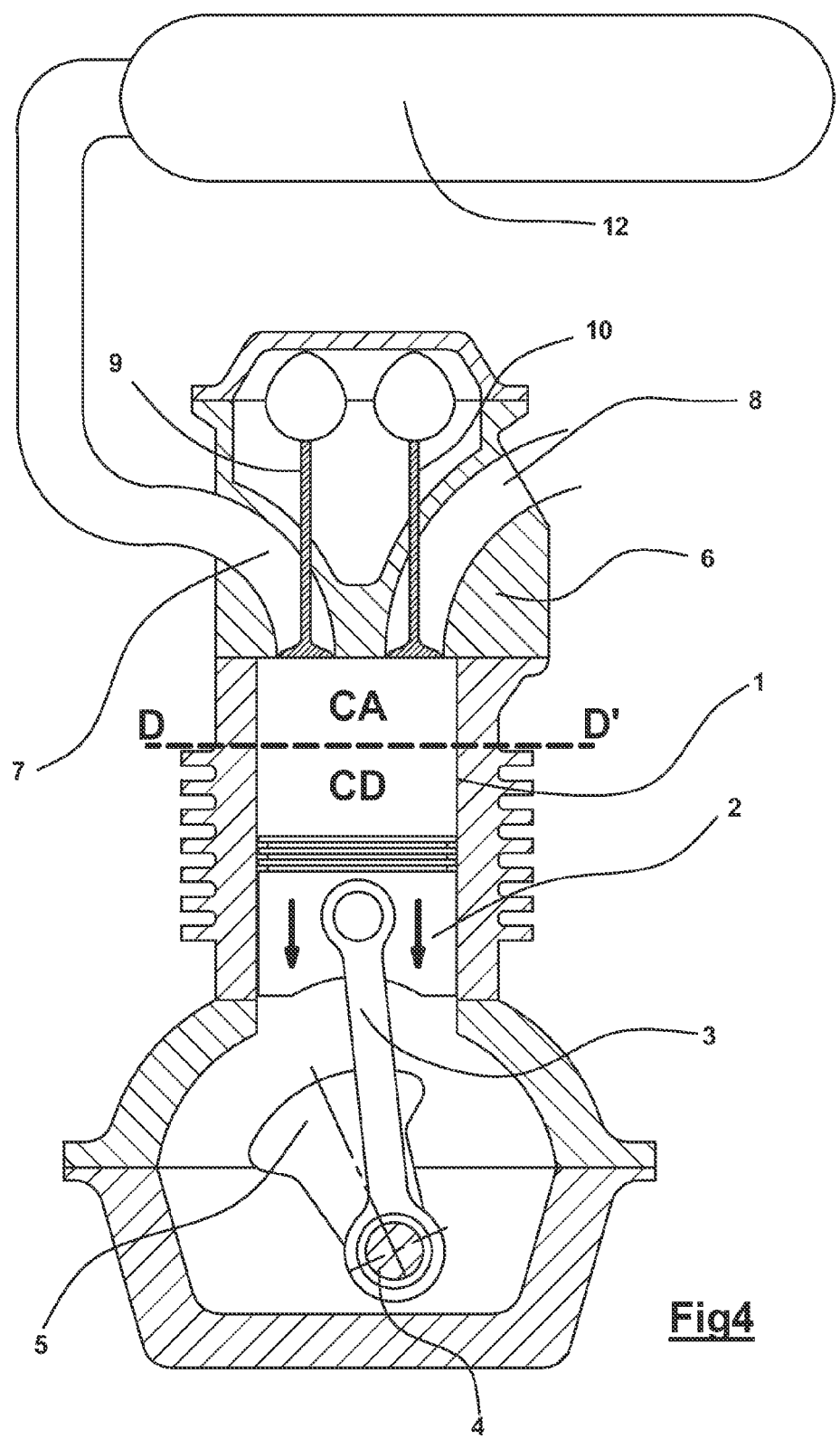

FIG. 3 represents the engine according to the invention when the piston 2 reaches the line DD' at which the volume of the active chamber CA is maximum and at which the pressure in the active chamber is at the pressure contained in the storage tank. The intake valve 9 is then closed and it stops the arrival of air under pressure. The compressed air contained in the active chamber CA then expands, pushing back the piston 1 toward its bottom dead center point (FIG. 4) and working as an expansion engine, and performing the second phase of the thermodynamic cycle: polytropic expansion with work.

The piston 1 then reaches its bottom dead center point (FIG. 1) corresponding to the maximum available volume of the cylinder swept by the piston, and the exhaust valve 10 is then opened to evacuate, through the exhaust duct 8, the expanded air, the pressure of which is close to ambient/atmospheric pressure to the atmosphere, during its upstroke, producing the phase of the thermodynamic cycle: exhaust at ambient pressure.

Figure 5:
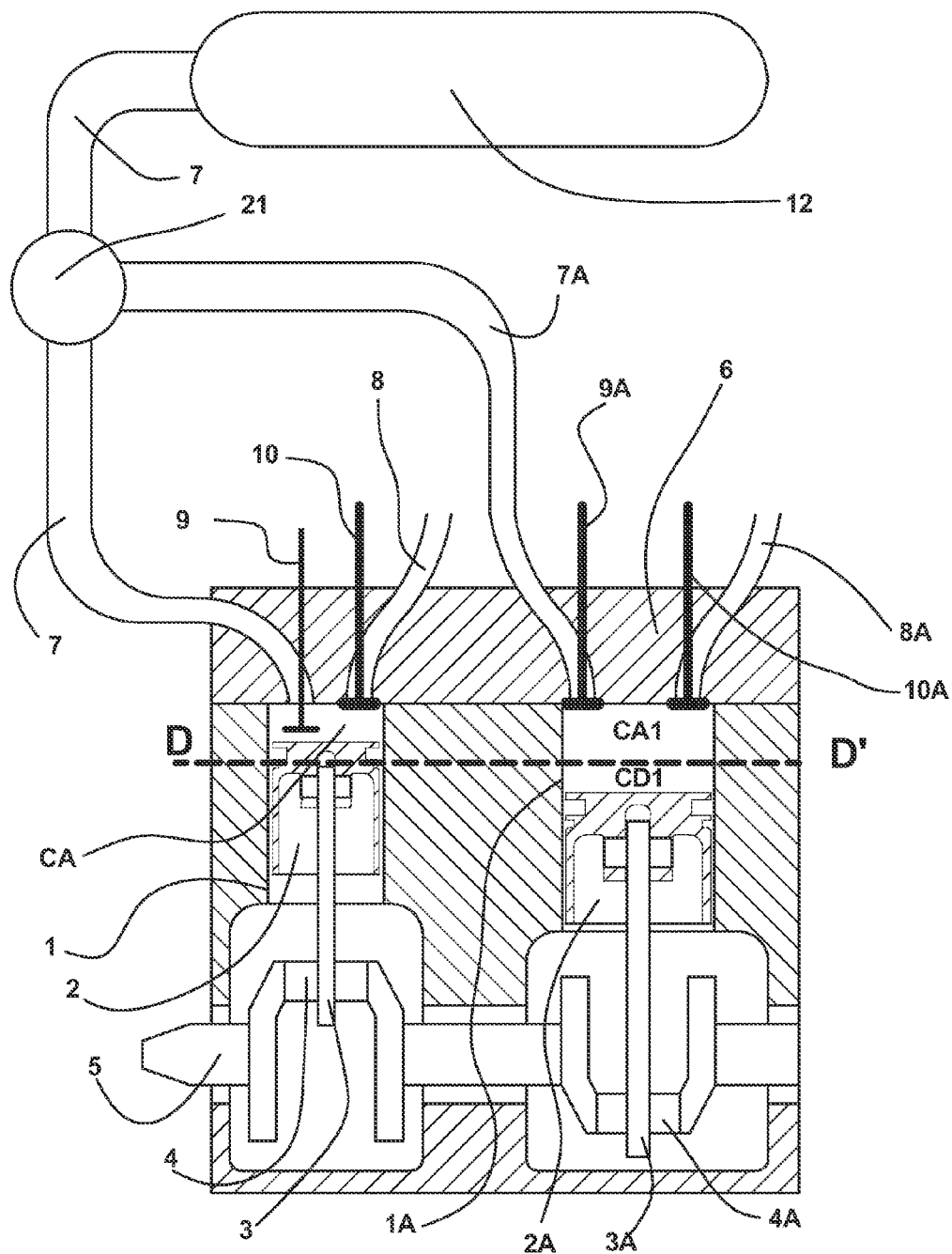
FIG. 5 represents an engine according to the invention comprising two cylinders.

FIG. 5 represents an engine according to the invention with two two-stage cylinders, of increasing cylinder sizes, on which can be seen, from left to right, the first cylinder 1 which is the cylinder of smallest cylinder size, in which a piston 2 slides, linked by a connecting rod 3 to the crank pin 4 of a crankshaft 5.

This first engine cylinder 1 is divided according to a line DD' into two parts: an active chamber CA and a partial expansion chamber CD (not visible in the drawing).

The first engine cylinder 1 is capped by a cylinder head 6 comprising, opening into the cylinder 1, an intake duct 7 and an exhaust duct 8 as well as means for blocking said ducts, these means here being intake 9 and exhaust 10 valves. The intake duct 7 is linked to the high-pressure tank 12 through a three-way valve 21. The exhaust duct 8 opens into the atmosphere.

The second stage consists of a second cylinder 1A, the cylinder size of which is greater than that of the first cylinder 1, in which a second piston 2A slides which is linked by a connecting rod 3A to the crank pin 4A of the common crankshaft 5.

The second engine cylinder 1A is divided according to a line DD' into two parts: a second active chamber CA1 and a second expansion chamber CD1.

The second engine cylinder 1A is capped by the cylinder head 6, here common, comprising, openings into the second cylinder 1A, an intake duct 7A and an exhaust duct 8A as well as means for blocking said ducts which here are intake 9A and exhaust 10A valves. The intake duct 7A is linked to the high-pressure tank 12 through the three-way valve 21. The exhaust duct 8A opens into the atmosphere.

The compressed air at high pressure contained in the high-pressure storage tank 12 feeds, through the 3-way valve 21, either the intake duct of the first cylinder 1, or the intake duct of the second cylinder 1A, or else the two cylinders 1 and 1A at the same time.

The pressure values indicated below in the brief description of the operation of the two-cylinder engine are given as nonlimiting examples of a realistic and possible embodiment of the invention.

During operation, when the pressure of the compressed air contained in the storage tank 12 is in the top range of the intake pressure values, for example in the top third, for a tank whose maximum pressure is 210 bar, for example between 140 bar and 210 bar, the three-way valve blocks the intake duct 7A and directs the compressed air toward the intake duct 7 of the first cylinder 1 which on its own ensures the operation of the engine according to the invention.

When the intake pressure of the compressed air contained in the storage tank 12 is in the intermediate range of the intake pressure values, for example corresponding to the median third of the intake pressure values, for a tank whose maximum pressure is 210 bar, for example between 70 bar and 140 bar, the three-way valve blocks the intake duct 7 and directs the compressed air toward the intake duct 7A of the second cylinder 1A which on its own ensures the operation of the self-pressure-regulating engine.

When the intake pressure of the compressed air contained in the storage tank 12 is in the bottom range of the intake pressure values, for example corresponding to the bottom third of the intake pressure values, for a tank whose maximum pressure is 210 bar, for example between 5 bar and 70 bar, the three-way valve simultaneously directs the compressed air both toward the intake duct 7 of the first cylinder 1 and toward the intake duct 7A of the second cylinder 1A, the two cylinders 1 and 1A together ensuring the operation of the engine.

Figure 6:
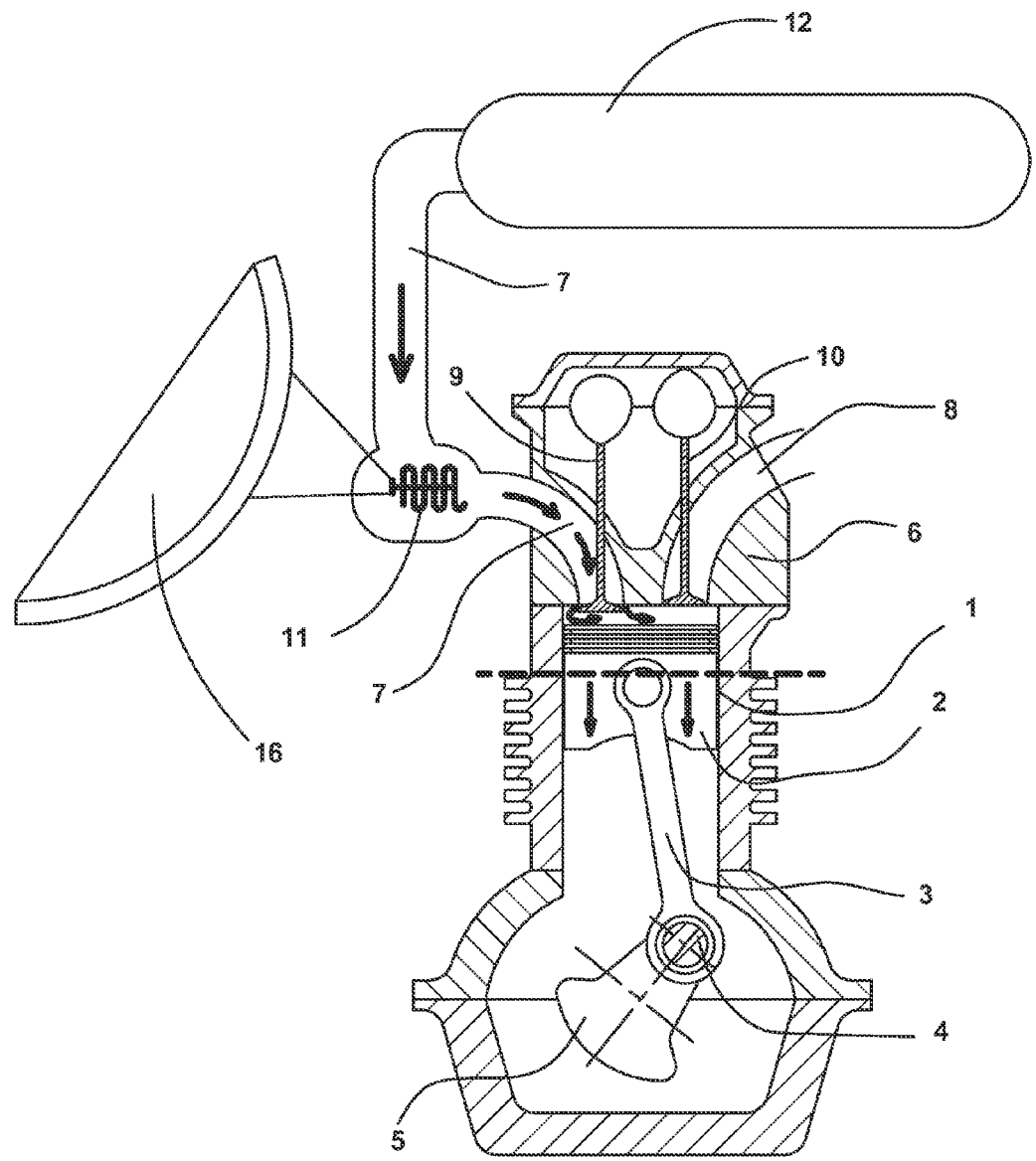
FIG. 6 represents an engine and its compressed air feed device, comprising a device for reheating the compressed air by means of a solar dish.

FIG. 6 represents an engine according to the invention with its high-pressure air feed device comprising a device for reheating the compressed air comprising a solar dish (16) focusing into a chamber making it possible to increase the temperature of the compressed air which passes through it. This device makes it possible to increase the quantity of energy that can be used and is available through the fact that the compressed air, before its introduction into the included active chamber CA, will increase its temperature and increase its volume making it possible, for one and the same performance level, to take from the storage tank 12 a lesser volume of air and increase the range of a vehicle equipped with this engine according to the invention.

FIG. 7 represents an engine according to the invention operating in stand-alone dual-energy mode with, for example, a so-called additional fossil energy, here in a thermal device comprising a burner 17 included in a chamber 17A and which is fed by a gas bottle 18.

The crankshaft 5, in its rotation, drives a compressed air compressor 19 which feeds the storage tank 12 through an air/air heat exchanger 20.

The general operation of the engine is identical to that described previously with reference to FIGS. 1 to 4. However, this arrangement makes it possible to fill the storage tank during operation with an additional energy.

The self-pressure-regulating engine with included active chamber is described with an operation with compressed air. However, it can use any compressed gas without in any way departing from the framework of the present invention.

The invention is not limited to the exemplary embodiments described and represented: the materials, the control means, the devices described can vary within the limits of the equivalents, to produce the same results. The number of engine cylinders, their cylinder size(s), the maximum volume of the active chamber in relation to the displaced volume of the cylinder(s) and the number of expansion stages, can also vary, without thereby departing from the framework of the present invention.

The invention claimed is:

1. An engine with active chamber, comprising at least one cylinder (1) and one piston (2) which is mounted to slide in the cylinder (1) and which drives a crankshaft (5) by means of a conventional connecting rod-crank device (3, 4), in which the volume of the cylinder (1) swept by the piston (2) is divided into two distinct parts, a first part constituting the active chamber (CA) which is included in the cylinder and a second part constituting the expansion chamber (CD), the cylinder (1) being closed in its top part by a cylinder head (6) including at least one duct and one intake orifice (7) and at least one duct and one exhaust orifice (8), and which is arranged in such a way that, when the piston (2) is at its top dead center point, the residual volume contained between the piston (2) and the cylinder head (6) is, by construction, reduced to the very minimum gaps enabling the contactless operation between the piston and the cylinder head, and in which compressed air, or any other gas under pressure, supplied from a storage tank of compressed air, or of any other gas under pressure, is admitted into the cylinder (1) above the piston, and, under the continuous thrust of the compressed air, or any other gas under pressure, the volume of the active chamber (CA) increases while producing work, the intake of the compressed air, or any other gas under pressure, into the cylinder is blocked when the maximum volume of the active chamber (CA) is reached, and the quantity of compressed air, or any other gas under pressure, contained in said active chamber then expands while pushing back the piston over the second part of its stroke while producing work thus ensuring the expansion phase, the piston having reached its bottom dead center point, the exhaust orifice is then opened to ensure the exhaust phase while the piston rises up over all of its stroke, characterized:

in that the storage tank (12) of compressed air at high pressure, or of any other gas under pressure, directly feeds the intake of the engine cylinder (1);

in that the active chamber (CA) in the cylinder is filled at a constant intake pressure on each engine revolution, this intake pressure decreasing as the pressure in the storage tank (12) decreases during the emptying of this tank, in that the maximum volume of the active chamber (CA) is variable and increases progressively as the pressure in the storage tank (12) which determines said intake pressure decreases;

in that means (7, 9) for opening and closing the intake of the compressed air into the active chamber (CA) make it possible not only to open the intake orifice and duct (7) substantially at the top dead center point of the stroke of the piston, but also make it possible to modify the duration and/or the angular sector of the intake, as well as the passage section of the opening;

in that the maximum volume of the active chamber (CA) is dimensioned for the maximum storage pressure, then is progressively increased so that, depending on the intake pressure, on the ratio of volumes between the included active chamber (CA) and the expansion chamber (CD), the pressure at the end of expansion before the opening of the exhaust (8) is close to atmosphere pressure.

2. The engine with active chamber as claimed in claim 1, characterized in that it operates according to a thermodynamic cycle with three phases comprising:
an isobaric and isothermal transfer;
a polytropic expansion with work;
an exhaust at ambient pressure.

3. The engine with active chamber as claimed in claim 2, characterized in that it comprises at least two cylinders of increasing cylinder size (1; 1A) each operating according to the same principle which has just been described, and characterized:

in that, when the intake pressure is in its top range, corresponding for example to the top third of the values of the intake pressure, only the cylinder of smallest cylinder size is fed;

in that, when the intake pressure is in an intermediate range, corresponding for example to the median third of the values of the intake pressure, only the second cylinder of larger cylinder size is fed;

and in that, when the intake pressure is in its bottom range, corresponding for example to the bottom third of the values of the intake pressure, the two cylinders are fed at the same time.

4. The engine with active chamber as claimed in claim 3, characterized in that it comprises at least three cylinders, including said at least two cylinders of increasing cylinder size, by virtue of which it is possible to adjust more finely the total cylinder size used as a function of the intake pressure, by having said at least three cylinders of the engine operate in succession, jointly and/or in combination.

5. The engine with active chamber as claimed in claim 1, in its dual-energy application, characterized in that, between the storage tank (12) and the intake of the engine, there is a thermal device forming an isobaric reheater making it possible to increase, at constant pressure, the temperature of the air, or of any other gas, which passes through it and to increase the quantity of energy which can be used and is available through the fact that the compressed air, or any other gas, at constant pressure and before its introduction into the active chamber (CA), will increase its temperature and increase its volume while making it possible to increase the range of a machine equipped with the engine, in proportion to said volume increase.

6. The engine with active chamber as claimed in claim 5, in its dual-energy application, characterized in that the thermal device forming an isobaric reheater comprises a solar dish focusing into the thermal device forming an isobaric reheater to make it possible to increase the temperature of the compressed air, or of any other gas, and to increase the quantity of energy that can be used and is available through the fact that the compressed air, or any other gas, at constant pressure, and before its introduction into the active chamber (CA) will increase its temperature and increase volume while making it possible to increase the range of said machine.

7. The engine with active chamber as claimed in claim 5, characterized in that its thermodynamic cycle has four phases comprising:
an increase in the isobaric temperature;
an isothermal transfer;
a polytropic expansion with work;
an exhaust at ambient pressure.

8. The engine with active chamber as claimed in claim 5, in its stand-alone dual-energy application, characterized in that it is coupled with and drives an air compressor (19) making it possible, during its operation with an additional energy, to feed compressed air, or any other gas, to the storage tank at high pressure (12).

9. The engine with active chamber as claimed in claim 8, characterized in that it comprises a heat exchanger, air-air or other, which is positioned between the compressor (19) and the storage tank (12) so that the compressed air, or any other gas, at high pressure and at high temperature at the output of the compressor returns, in the storage tank, to a temperature close to ambient temperature.

10. The engine with active chamber as claimed in claim 9, characterized in that its thermodynamic cycle comprises six phases comprising:
   a polytropic compression of the ambient/atmospheric air;
   a cooling to ambient/atmospheric temperature for storage;
   an increase in the isobaric temperature;
   an isobaric/isothermal transfer;
   a polytropic expansion with work;
   an exhaust at ambient pressure.

11. The engine with active chamber as claimed in claim 1, characterized in that the torque and the speed of the engine are controlled by a device driven by an accelerator which controls the opening and closing of the means (9) for opening/closing the intake duct (8) which feeds compressed air, or any other gas, to the active chamber (CA) while making it possible not only to open the opening/closing means, substantially at the top dead center point, but also to modify the duration and/or the angular sector of the intake, as well as the passage section of the opening in order to determine the pressure at the end of expansion, as a function of the pressure in the storage tank (12), the quantity of compressed air, or of any other gas, admitted, the volume of the active chamber (CA) by the closing of the opening/closing means (9).

12. The engine with active chamber as claimed in claim 5, characterized in that, during operation in dual-energy mode with an additional energy, the engine comprises an electronic computer which controls the quantity of energy added as a function of the pressure of the compressed air, or of any other gas, and therefore of the weight of air, or of any other gas, introduced into the active chamber (CA).

13. The engine with active chamber as claimed in claim 1, characterized in that the engine operates according to three modes, which can be used separately or in combination, comprising:

the single-energy, zero-pollution, operating mode, with the air, or any other gas, previously compressed contained in the storage tank at high pressure;

the dual-energy operating mode, with the air, or any other gas, previously compressed contained in the storage tank plus the additional energy added by a thermal device forming a repeater;

the stand-alone dual-energy operating mode, with the air, or any other gas, compressed in the storage tank by a compressor driven by the engine, plus the additional energy added by the thermal device forming a repeater.

14. The engine with active chamber as claimed in claim 6, characterized in that its thermodynamic cycle has four phases comprising:
   an increase in the isobaric temperature;
   an isothermal transfer;
   a polytropic expansion with work;
   an exhaust at ambient pressure.

15. The engine with active chamber as claimed in claim 6, characterized in that its thermodynamic cycle has four phases comprising:
   an increase in the isobaric temperature;
   an isothermal transfer;
   a polytropic expansion with work;
   an exhaust at ambient pressure.

16. The engine with active chamber as claimed in claim 6, characterized in that, during operation in dual-energy mode with an additional energy, the engine comprises an electronic computer which controls the quantity of energy added as a function of the pressure of the compressed air, or of any other gas, and therefore of the weight of air, or of any other gas, introduced into the active chamber (CA).

* * * * *